(12) United States Patent
Lu et al.

(10) Patent No.: US 11,989,850 B2
(45) Date of Patent: May 21, 2024

(54) METHOD FOR CALCULATING IMAGE HIGHLIGHT REFLECTION SEPARATION BASED ON POLARIZATION GUIDANCE

(71) Applicant: Beihang University, Beijing (CN)

(72) Inventors: Feng Lu, Beijing (CN); Sijia Wen, Beijing (CN)

(73) Assignee: Beihang University, Beijing (CN)

( * ) Notice: Subject to any disclaimer, the term of this patent is extended or adjusted under 35 U.S.C. 154(b) by 330 days.

(21) Appl. No.: 17/566,858

(22) Filed: Dec. 31, 2021

(65) Prior Publication Data
US 2022/0230273 A1  Jul. 21, 2022

(30) Foreign Application Priority Data

Jan. 20, 2021  (CN) .......................... 202110076538.0

(51) Int. Cl.
*G06T 3/04* (2024.01)
*G06T 7/557* (2017.01)
*G06T 7/593* (2017.01)

(52) U.S. Cl.
CPC ................ *G06T 3/04* (2024.01); *G06T 7/557* (2017.01); *G06T 7/593* (2017.01)

(58) Field of Classification Search
None
See application file for complete search history.

(56) References Cited

U.S. PATENT DOCUMENTS

| 8,498,460 B2 * | 7/2013 | Patwardhan | A61B 5/441 382/128 |
| 11,762,049 B2 * | 9/2023 | Kamiguchi | G01R 33/561 382/131 |
| 2003/0103261 A1 * | 6/2003 | Hay | G02B 26/00 359/488.01 |
| 2006/0285207 A1 * | 12/2006 | Hay | G02B 27/281 359/488.01 |

(Continued)

OTHER PUBLICATIONS

Q. Yang, J. Tang and N. Ahuja, "Efficient and Robust Specular Highlight Removal," in IEEE Transactions on Pattern Analysis and Machine Intelligence, vol. 37, No. 6, pp. 1304-1311, Jun. 1, 2015, doi: 10.1109/TPAMI.2014.2360402. (Year: 2015).*

(Continued)

*Primary Examiner* — Tahmina N Ansari

(57) ABSTRACT

The embodiments of the present disclosure disclose method for calculating image highlight reflection separation. A specific implementation of the method includes: controlling a polarized color sensor to shoot a polarized color image, and calculating a polarized chromaticity image; clustering the pixels of diffuse reflection components whose chromaticity difference is within a preset range, to obtain a pixel sequence set; using a robust principal component analysis algorithm for each pixel, to obtain an initial separation result; further processing the polarized color image for highlight reflection separation, to obtain a highlight reflection separation result, and generating a diffuse reflection image. This implementation can achieve highlight reflection (Continued)

separation for images without being affected by the lighting information, and obtain a highlight reflection separation result with higher accuracy through the color and polarization information.

5 Claims, 5 Drawing Sheets

(56) References Cited

U.S. PATENT DOCUMENTS

| | | | | |
|---|---|---|---|---|
| 2007/0071971 | A1* | 3/2007 | Drogan | B32B 7/06 |
| | | | | 428/343 |
| 2011/0206254 | A1* | 8/2011 | Patwardhan | A61B 5/0077 |
| | | | | 382/128 |
| 2022/0230273 | A1* | 7/2022 | Lu | G06T 7/90 |
| 2023/0316571 | A1* | 10/2023 | Kadambi | G06T 5/50 |
| | | | | 382/188 |

OTHER PUBLICATIONS

Atif Anwer. Specular highlight mitigation using unsupervised multi-domain adversarial generation of specularity-free images inferred from polarimetric data. Artificial Intelligence [cs.AI]. Normandie Université; Université de technologie de Petronas, 2022. Online: https://theses.hal.science/tel-040687 (Year: 2022).*

* cited by examiner

METHOD FOR CALCULATING IMAGE HIGHLIGHT REFLECTION SEPARATION BASED ON POLARIZATION GUIDANCE

CROSS-REFERENCE TO RELATED APPLICATIONS

The present application is based on, and claims priority from, Chinese application number CN202110076538.0, filed Jan. 20, 2021, the disclosure of which is hereby incorporated by reference herein in its entirety.

TECHNICAL FIELD

The embodiments of the present disclosure relate to the technical field of computer vision and image processing, and in particular, to method for calculating image highlight reflection separation.

BACKGROUND

In general, on the uneven surface of a dielectric object, the reflected image is composed of a diffuse reflection component and a highlight reflection component. The lighting information and object material properties in the scene often significantly affect the highlight reflection component, while the diffuse reflection component contains the surface's constant inherent characteristics.

For a wide range of computer vision tasks, such as object segmentation, three-dimensional reconstruction, multi-vision stereo, and motion detection, the highlight reflection component is usually regraded as an abnormal value. However, in each pixel in the image, the highlight reflection component is usually combined with the diffuse reflection component. Therefore, the above computer vision tasks often assume that there is no highlight reflection component in the application scenario. However, this simple assumption of the surface properties of the objects in the scene will reduce the performance of such applications. In order to solve this challenging problem, many highlight reflection separation methods using color information or polarization information have been proposed at this stage.

Based on the analysis of the color space information, some methods with certain prior knowledge eliminate the highlight reflection by understanding the distribution of the diffuse reflection component and the highlight reflection component in the color space. Tan proposed a typical method in which they first generated an image without highlight reflection. Although this kind of image loses the color characteristics of the image, the image without highlight reflection can be used to propagate the color information to the highlight reflection area in the original image. Yang and et al. based on a two-color reflection model estimated the lighting information of the scene to separate the highlight reflection component. However, in the real world, lighting information is unstable and difficult to measure. Besides, as these algorithms rely on statistics or priori assumptions about image information, the effects of such methods in real scenes are not robust.

According to the polarization theory, the highlight reflection component usually has a strong polarizability, while the diffuse reflection component is totally unpolarized. By placing a polarizing filter in front of the image sensor, many methods can achieve a rather ideal highlight reflection separation result while reducing the image color distortion of the separation result. However, since the correlation between color information and polarization information is not fully utilized, these methods cannot obtain a satisfactory color result. In addition, the images collected by adding a polarizer in front of the sensor often lack a certain degree of scene information. Considering the above problems, the highlight reflection separation method is still a very challenging task.

Under this premise, the present disclosure provides a method for calculating image highlight reflection separation based on polarization guidance, which uses a single-chip polarized color sensor to collect scene pictures with polarization information and color information. By calculation of the polarization and color information, and iterative adjustments through optimization models, the traditional methods' disadvantages of poor stability and low accuracy are solved, thereby achieving the separation of the highlight reflection component.

SUMMARY

The content of the present disclosure is to introduce concepts in a brief form, and these concepts will be described in detail in the following section of the detailed description of the disclosure. The content of the present disclosure is not intended to identify the key features or essential features of the claimed technical solution, nor is it intended to limit the scope of the claimed technical solution.

Some embodiments of the present disclosure propose an image highlight reflection separation calculating method, apparatus, electronic device and computer readable medium to solve one or more of the technical problems mentioned in the background section above.

According to the above actual needs and technical difficulties, the purpose of the present disclosure is: to propose a method for calculating image highlight reflection separation based on polarization guidance which, by analyzing the polarization information and color information, generates a polarized chromaticity image for subsequent guidance, and through the method of polarization initialization and iterative adjustment, achieves the separation of the image highlight reflection component. This method has no additional constraints on the application scenario, and can use the images taken by a single-chip polarized color camera as input. At the same time, this method achieves better separation results than other methods by proposing a polarization guidance model and an iterative optimization model. The specific steps of the method for calculating image highlight reflection separation based on polarization guidance, of the present disclosure, are to as follows: control a polarized color sensor to shoot a polarized color image, and calculate a polarized chromaticity image according to the polarization information and color information of the polarized color image; based on the characteristics of the polarization information, use the polarized chromaticity image as a guide, cluster the pixels of diffuse reflection components whose chromaticity difference is within a preset range, to obtain a pixel sequence set, wherein the characteristics of the polarization information are the characteristics that, in case the polarized chromaticity image has highlight information, the color information of the diffuse reflection components of the polarized color image is still obtained, and wherein each pixel in every pixel sequence in the pixel sequence set has a diffuse reflection component whose chromaticity meets the preset condition, and due to the difference in surface material and lighting direction, each pixel in every pixel sequence in the pixel sequence set has a different degree of highlight reflection component; use a robust principal component analysis algorithm for each pixel in every pixel sequence in the pixel sequence set to retain the diffuse reflection component of each pixel in the pixel sequence, and at the same time, remove the highlight reflection component of each pixel in the pixel sequence, and in the end, preliminarily separate the polarized chromaticity image into a diffuse reflection component and a highlight reflection component, to obtain an initial separation result, wherein the initial separation result includes the diffuse reflection component and the highlight reflection component, and there is an invariant highlight reflection component in the diffuse reflection component; use the initial separation result as a constraint, and based on the iterative optimization algorithm of the alternating direction method of multipliers, further process the polarized color image for highlight reflection separation to obtain a highlight reflection separation result, and generate a diffuse reflection image based on the highlight reflection separation result.

First, the present disclosure proposes a polarization-guided highlight reflection separation model to realize wide application in natural scenes. According to the polarization theory, the diffuse reflection component tends to have no polarization, while the highlight reflection component will change with different angles of the polarization direction. Based on this observation, an original diffuse reflection image can be obtained by transmitting a sine wave of radiation, and this original diffuse reflection image is a result of removing the highlight reflection component that underwent polarization changes. Since the original diffuse reflection image is composed of constant parts of the highlight reflection component and the diffuse reflection component, it shall not be regarded as a result of the highlight reflection separation. However, by calculating the chromaticity of the original diffuse reflection image, the present disclosure calculates and generates a polarized chromaticity image, which can retain its own color information in the polarized color image with highlight reflection. Besides, the polarized chromaticity image can further describe the accurate geometric outline of the input image without being affected by the color of lighting. Using a polarized chromaticity image, the polarization guidance model can cluster pixels of diffuse reflection components whose color chromaticity difference is within a preset range. In this case, the highlight reflection component can be regarded as noise in the cluster. The method of stable principal component analysis is used to de-noise all pixel sequences. The polarization guidance model can remove most of the highlight reflection component from the image.

Even though the polarization guidance model can provide fairly ideal results, the highlight reflection component is in effect partially polarized, which means that the constant part in the highlight reflection component still needs to be removed. Different from setting some priori knowledge, the present disclosure proposes a highlight separation model, which takes the result of the polarization guidance model as an implicit expression of the diffuse reflection component, and imposes sparse constraints on the highlight reflection component. In the end, the highlight reflection separation model is reconstructed into a global energy function that can be adjusted by an ADMM (Alternating Direction Method of Multipliers) strategy, so as to obtain an ideal highlight reflection separation result. In addition, newly released polarization cameras (for example, RGB cameras) are employed to collect data sets. The experimental results proved the effectiveness and robustness of this method.

Compared with other highlight reflection separation methods, the present disclosure has such beneficial features as that: based on the analysis of the polarization of the reflected image, a polarized chromaticity image is proposed; the image can describe the accurate geometric outline and color information of the input image without being affected by lighting; a polarization guidance model is designed, to implement highlight reflection separation on the image without being affected by lighting information; a customized optimization strategy based on ADMM is designed, to obtain a highlight reflection separation result with higher accuracy through color and polarization information.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Figure 1:
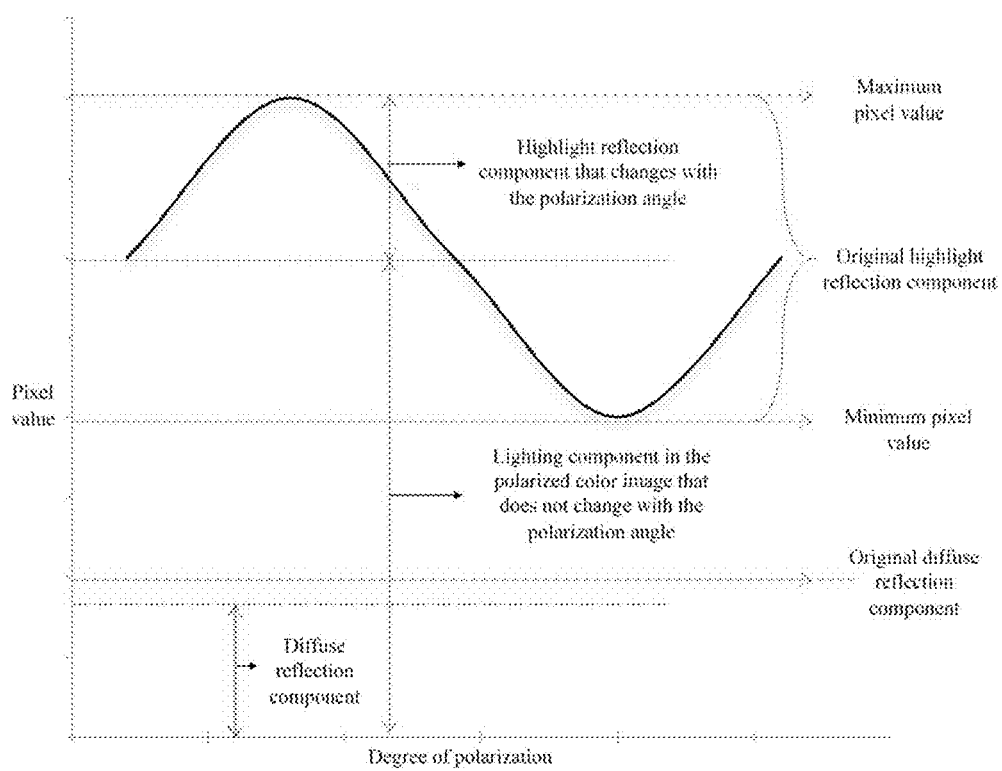
FIG. 1 is a schematic diagram of the pixel intensity polarization changes according to some embodiments of the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant disclosure are shown in the drawings. In the case of no conflict, the embodiments in the present disclosure and the features in the embodiments can be combined with each other.

It should be noted that such adjuncts as "one" and "more" mentioned in the present disclosure are illustrative, not restrictive, and those skilled in the art should understand that, unless the context clearly indicates otherwise, they should be understood as "one or more".

Hereinafter, the present disclosure will be described in detail with reference to the drawings and in conjunction with the embodiments.

FIG. 1 is a schematic diagram of the pixel intensity polarization changes according to some embodiments of the present disclosure.

As the polarization angle changes, the pixel value will change due to the polarization of light, which can be expressed by the following cosine function:

$$I(\phi) = I_d + I_{sc} + I_{sv} \times \cos 2(\phi - \alpha) = I_c + I_{sv} \times \cos 2(\phi - \alpha).$$

Wherein, $\phi$ represents the polarization angle. $I(\phi)$ represents the pixel value of $\phi$. $I_d$ represents the diffuse reflection component. $I_{sc}$ represents the highlight reflection component that does not change. $I_{sv}$ represents the highlight reflection component that changes with the polarization angle. $\alpha$ represents the azimuth angle value. $I_c$ represents the lighting component in the polarized color image that does not change with the polarization angle.

Since the single-chip polarized color sensor can directly collect the color information of four polarization angles, the lighting component in the polarized color image that does not change with the polarization angle, the highlight reflection component that changes with the polarization angle, and the azimuth angle value can be solved directly through matrix operation as mentioned above. As shown in FIG. 1, an approximate diffuse reflection component and an approximate highlight reflection component can be obtained. The calculation method is as follows:

$$\begin{cases} I_{rawS} = 2 \times I_{sv} \\ I_{rawD} = I_c - I_{rawS} \end{cases}.$$

Wherein, $I_{rawS}$ represents the approximate diffuse reflection component. $I_{sv}$ represents the highlight reflection component that changes with the polarization angle. $I_c$ represents the lighting component in the polarized color image that does not change with the polarization angle. $I_{rawD}$ represents the approximate highlight reflection component.

Figure 2:
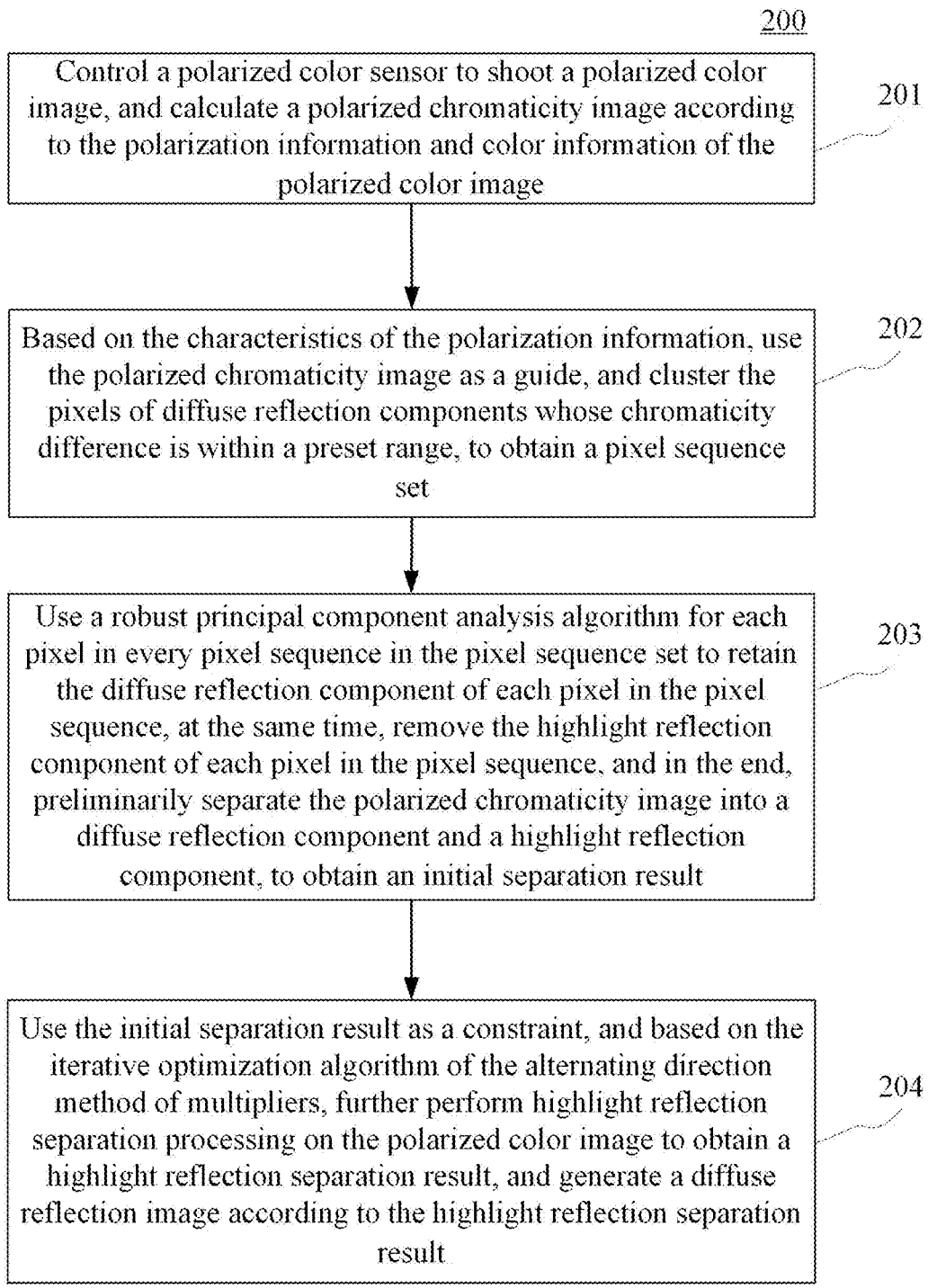
FIG. 2 is a flowchart of some embodiments of the method for calculating image highlight reflection separation according to the present disclosure.

Continue to see FIG. 2, wherein a process 200 of some embodiments of the method for calculating image highlight reflection separation according to the present disclosure is shown. The method for calculating image highlight reflection separation includes the following steps:

Step 201: Control a polarized color sensor to shoot a polarized color image, and calculate a polarized chromaticity image according to the polarization information and color information of the polarized color image.

In some embodiments, the executive body of the method for calculating image highlight reflection separation may control a polarized color sensor to shoot a polarized color image, and calculate a polarized chromaticity image according to the polarization information and color information of the polarized color image. Wherein, the above executive body can use the polarization information to calculate the polarized chromaticity image, and the polarized chromaticity image can help obtain the color information of the diffuse reflection component of the polarized color image without being affected by the highlight information. The image of an object in the display can be divided into a diffuse reflection component and a highlight reflection component. The diffuse reflection component and the highlight reflection component are of an additive relationship. Therefore, when the highlight component is too strong, the color of the object itself will be blocked, making it difficult for other visual tasks to perform well. The above polarized color sensor may be a sensor capable of simultaneously capturing polarization information and color information. The image recorded by the polarized color sensor includes the color information and polarization information of the scene. The polarized color image records such three information as R (red), G (green), and B (blue), which are formed into a color image through different combinations. The polarization information records such four polarization information as 0, 45, 90, 135, so as to realize the imaging of the scene polarization. The polarized color image may be an image taken by a polarized color sensor. The polarized chromaticity image may be a polarized chromaticity image generated by analyzing and calculating the color and polarization information. The polarized chromaticity image has the characteristic that, under the influence of highlights, it is difficult for the polarized chromaticity image to show the accurate color of the scene itself, but it can make pixels having diffuse reflection components of similar colors to perform the imaging in a similar form of chromaticity, so as to achieve the effect of accurately clustering pixels of similar colors.

As an example, when a yellow doll is illuminated by strong light, the reflection spots will appear white on the image, but the polarized chromaticity image can show the color of the yellow doll itself, that is, yellow.

In certain optional implementations of some embodiments, the above executive body controls the polarized color sensor to shoot a polarized color image, and calculates a polarized chromaticity image according to the polarization information and color information of the polarized color image, which may include the following steps:

The first step is to use a single-chip polarized color sensor to collect a polarized color image.

The second step is to perform polarization separation on the highlight reflection component to obtain a separation result. Wherein, the highlight reflection component has strong polarization. The strong polarization may be a polarization with a polarization degree greater than a predetermined threshold.

The third step is to calculate a polarized chromaticity image through the separation result.

Figure 3:
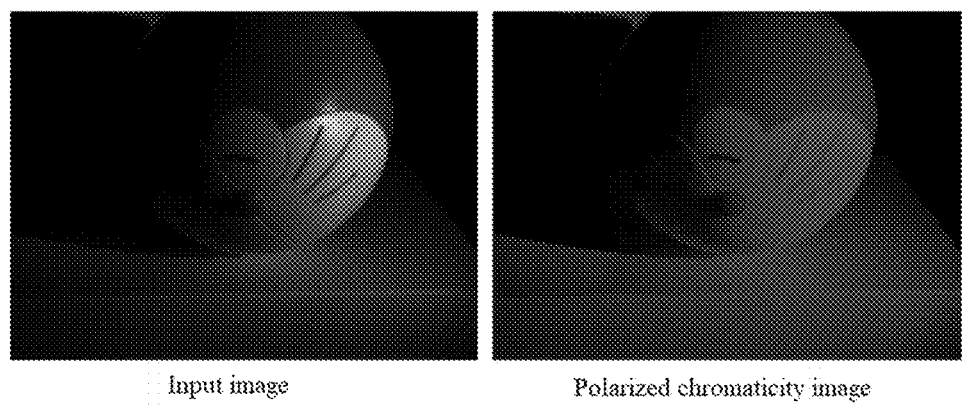
FIG. 3 is a schematic diagram of the polarized chromaticity image according to the present disclosure.

FIG. 3 is a schematic diagram of the polarized chromaticity image of the present disclosure. Based on the approximate diffuse reflection component and the approximate highlight reflection component obtained above, the present disclosure proposes a method for calculating the polarized chromaticity image. As shown in FIG. 3, this polarized chromaticity image can show the color of diffuse reflection component without being affected by highlights. As shown in the area with highlights in FIG. 3, although the highlight reflection obviously affects the color information of the highlight area, the polarized chromaticity image proposed by the present disclosure can still accurately express the diffuse reflection color of the pixels in this area. The calculation method of the polarized chromaticity image is as follows:

$$\begin{cases} I_{chro} = \dfrac{I_{rawD}}{\sum_\theta I_{rawD,\theta} + \overline{I_{min}}} \\ \overline{I_{min}} = \dfrac{\sum_p \min(I_r(p) + I_g(p) + I_b(p))}{N} \end{cases}.$$

Wherein, $I_{chro}$ represents the polarized chromaticity image. $I_{rawD}$ represents the approximate highlight reflection component. $\theta$ represents the three color channels of R (red), G (green), and B (blue). $I_{rawD,\theta}$ represents the approximate highlight reflection components of R, G, and B. $\overline{I_{min}}$ means to find the global average of the smallest value among the three color channels of pixels R, G, and B in the polarized chromaticity image. p represents each pixel in the polarized chromaticity image. $I_r(p)$ represents the r channel value of the pixel p in the polarized chromaticity image. r represents the red channel value. $I_g(p)$ represents the g channel value of the pixel p in the polarized chromaticity image. g represents the green channel value. $I_b(p)$ represents the b channel value of the pixel p in the polarized chromaticity image. b represents the blue channel value. N represents the number of pixels in the polarized chromaticity image.

The purpose of introducing the global average of the smallest value among the three color channels of pixels R, G, and B in the polarized chromaticity image is to solve the imaging instability caused by dark pixels or noisy pixels in the polarized chromaticity image. The polarized chromaticity image proposed by the present disclosure is not sensitive to noise. Besides, when the chromaticity difference between the diffuse reflection color and the lighting color is less than a preset threshold, the polarized chromaticity image will not be affected. Therefore, the polarized chromaticity image can help cluster the pixels of color diffusion components whose chromaticity meets a preset condition.

Step 202: Based on the characteristics of the polarization information, use the polarized chromaticity image as a guide, cluster the pixels of diffuse reflection components whose chromaticity difference is within a preset range to obtain a pixel sequence set.

In some embodiments, the above executive body may according to the characteristics of the polarization information, use the polarized chromaticity image as a guide to cluster the pixels of diffuse reflection components whose chromaticity difference is within a preset range, to obtain a pixel sequence set. Wherein, the characteristics of the polarization information are the characteristics that, in cases the polarized chromaticity image has highlight information, the color information of the diffuse reflection components of the polarized color image are still obtained. Each pixel in every pixel sequence in the pixel sequence set has a diffuse reflection component whose chromaticity meets the preset conditions. Due to the difference in surface material and lighting direction, each pixel in every pixel sequence in the pixel sequence set has a different degree of highlight reflection component.

In certain optional implementations of some embodiments, the above executive body, according to the characteristics of the polarization information, using the polarized chromaticity image as a guide to cluster the pixels of diffuse reflection components whose chromaticity difference is within a preset range to obtain a pixel sequence set, may include the following steps:

Making use of the characteristic that the polarized chromaticity image still shows the color of the diffuse reflection component of the pixel in the case of unknown lighting information, to cluster the pixels of diffuse reflection components whose chromaticity difference is within a preset range in the polarized color image to obtain a pixel sequence set.

Step 203: Use a robust principal component analysis algorithm for each pixel in every pixel sequence in the pixel sequence set to retain the diffuse reflection component of each pixel in the pixel sequence, at the same time, remove the highlight reflection component of each pixel in the pixel sequence, and in the end, preliminarily separate the polarized chromaticity image into a diffuse reflection component and a highlight reflection component, to obtain an initial separation result.

In some embodiments, the above executive body may use a robust principal component analysis algorithm for each pixel in every pixel sequence in the pixel sequence set to retain the diffuse reflection component of each pixel in the pixel sequence, at the same time, remove the highlight reflection component of each pixel in the pixel sequence, and in the end, preliminarily separate the polarized chromaticity image into a diffuse reflection component and a highlight reflection component, to obtain an initial separation result. Wherein, the initial separation result includes the diffuse reflection component and the highlight reflection component, and there is an invariant highlight reflection component in the diffuse reflection component.

In certain optional implementations of some embodiments, the above executive body using a robust principal component analysis algorithm for each pixel in every pixel sequence in the pixel sequence set to retain the diffuse reflection component of each pixel in the pixel sequence, at the same time, remove the highlight reflection component of each pixel in the pixel sequence, and in the end, preliminarily separate the polarized chromaticity image into a diffuse reflection component and a highlight reflection component, to obtain an initial separation result, may include the following steps:

The first step is viewing the highlight reflection component as noise in the pixel sequence set. Wherein, each pixel in every pixel sequence in the pixel sequence set has a diffuse reflection component whose chromaticity meets a preset condition and a highlight reflection component with a different degree value.

The second step is using the robust principal component analysis algorithm to directly de-noise each pixel sequence, so as to preliminarily obtain the separated diffuse reflection component and highlight reflection component, and obtain an initial separation result.

Figure 4:
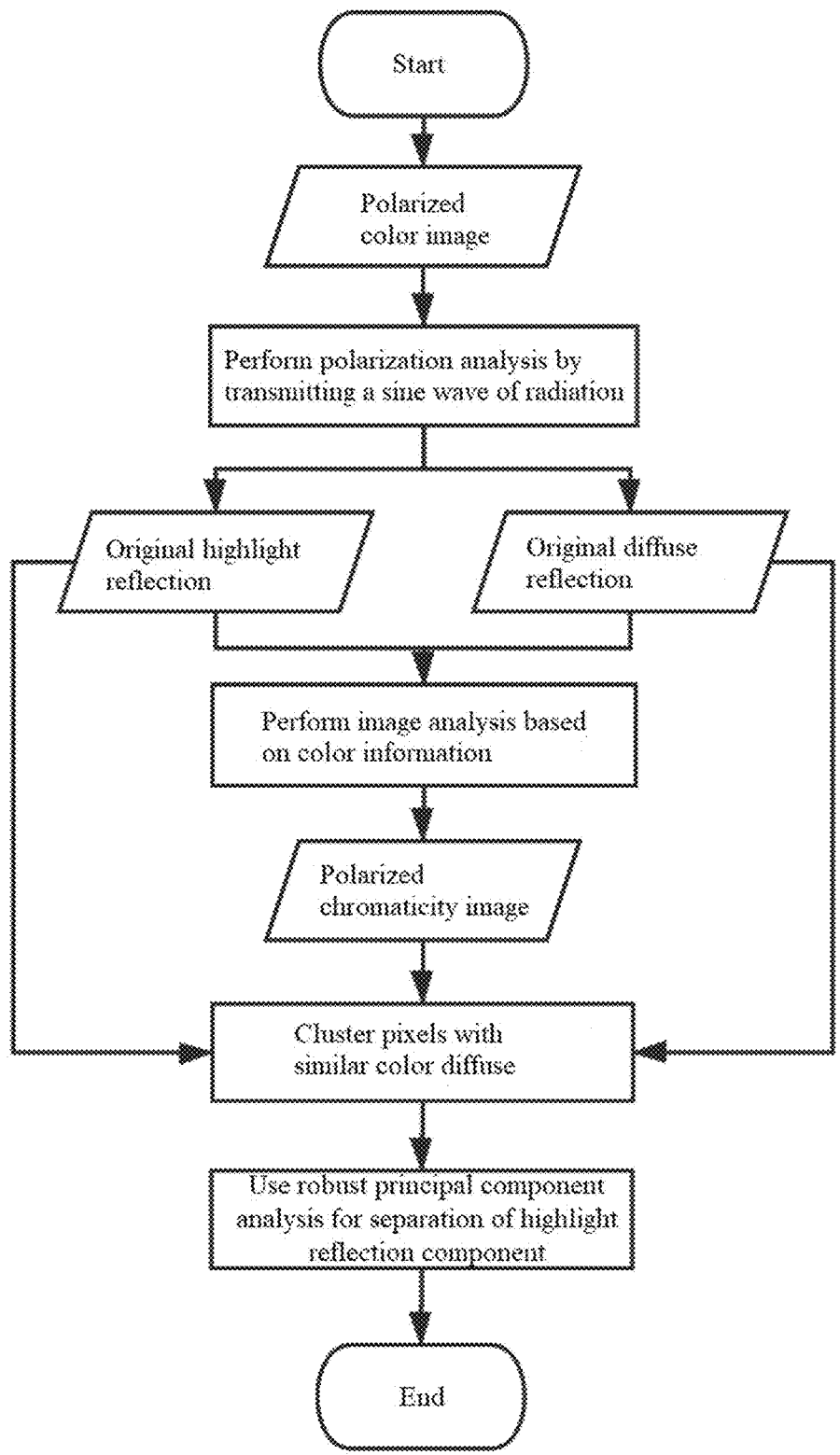
FIG. 4 is a flowchart of the polarization guidance model according to the present disclosure.

FIG. 4 is a flowchart of the polarization guidance model of the present disclosure, which introduces a polarization guidance model to separate the highlight reflection component of the image. As shown in FIG. 1, the diffuse reflection component is obviously smaller than the minimum pixel value, therefore the following inequality can be derived:

$$\begin{cases} I_d < I_c - I_{sv} \\ I_d - I_{rawD} < I_{sv} \end{cases}.$$

Wherein, $I_d$ represents the diffuse reflection component. $I_c$ represents the lighting component in the polarized color image that does not change with the polarization angle. $I_{sv}$ represents the highlight reflection component that changes with the polarization angle. $I_{rawD}$ represents the approximate highlight reflection component. $I_{sv}$ represents the highlight reflection component that changes with the polarization angle.

It can be found that, when the difference between the value of the pixel in the collected image and the value of the diffuse reflection component is smaller than the highlight reflection component that changes with the polarization angle, it means that the pixel belongs to a pure diffuse reflection component. Based on this observation, the polarized chromaticity image is used to classify the pixels of an input image into pixels with pure diffuse reflection components and pixels with mixed diffuse reflection components. Furthermore, the present disclosure sets a threshold value T. When the pixel value of the mixed diffuse reflection component and the pixel value of the pure diffuse reflection component are smaller than the threshold value T, these pixels have diffuse reflection components with similar colors. Based on this rule, the present disclosure clusters the pixels in the image. Pixels in each category have diffuse reflection components with similar colors and highlight reflection components of different degrees. In this case, the highlight reflection components in each category can be regarded as temporal noise. The present disclosure, based on the low rank of the diffuse reflection component of the pixels in each cluster and the sparsity of the highlight reflection component, designs a separation model, as shown below:

$$\min_{D,S} rank(D) + \lambda \|S\|_0$$
$$\text{s.t.} \quad C = D + S, S > 0.$$

Wherein, C, D, S represent a matrix of a dimension X×3. X represents the number of pixels in the cluster. C represents clustering. S represents the highlight reflection component. D represents the diffuse reflection component in each cluster. rank( ) is to find the rank of the matrix. $\lambda$ represents the coefficient that balances the sparsity of highlight components. $\| \|_0$ represents the 0 norm, because the highlight component is non-zero, for calculating the non-zero number of highlight components. s. t. represents the mathematical term subject to, meaning that when C=D+S, find the minimum value of the sum of the rank of D plus the non-zero number of S.

The present disclosure first uses the robust principal component analysis algorithm to adjust and solve the above model, and by removing the noise in each category, obtains the result of the highlight reflection separation based on the polarization guidance model.

Step 204: Use the initial separation result as a constraint, and based on the iterative optimization algorithm of the alternating direction method of multipliers, further perform highlight reflection separation processing on the polarized color image to obtain a highlight reflection separation result, and generate a diffuse reflection image according to the highlight reflection separation result.

In some embodiments, the above executive body may use the initial separation result as a constraint, and based on the iterative optimization algorithm of the alternating direction method of multipliers, further perform highlight reflection separation processing on the polarized color image to obtain a highlight reflection separation result, and generate a diffuse reflection image according to the highlight reflection separation result.

In certain optional implementations of some embodiments, the above executive body using the initial separation result as a constraint, and based on the iterative optimization algorithm of the alternating direction method of multipliers, further performing highlight reflection separation processing on the polarized color image to obtain a highlight reflection separation result, and generating a diffuse reflection image according to the highlight reflection separation result, may include the following steps:

Based on the iterative optimization model, use the initial separation result as a constraint, and use the ADMM optimization strategy to generate the highlight reflection separation result, and further adjust the highlight reflection separation result of the polarized color image to obtain a diffuse reflection image. Wherein, the highlight reflection component has a polarization whose intensity is greater than a predetermined threshold, but some highlight reflection components will not change with the change of the polarization angle, which makes the diffuse reflection components included in the initial separation result comprise a certain number of highlight reflection components.

Figure 5:
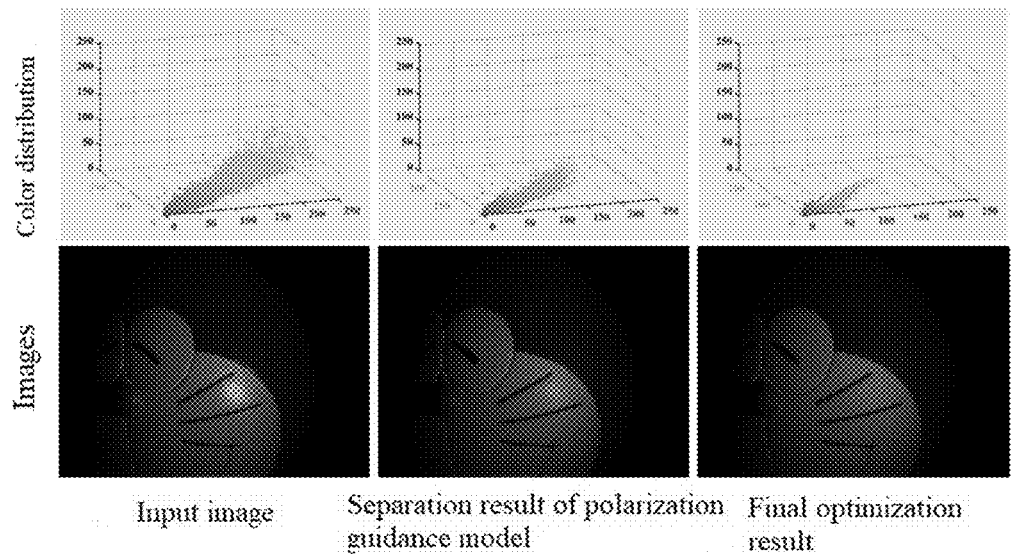
FIG. 5 is a schematic diagram of the iterative adjustment result according to the present disclosure.

FIG. 5 is a schematic diagram of the iterative adjustment result of the present disclosure. Although the polarization guidance model can obtain the highlight separation result without being affected by the lighting, there are still some constant highlight reflection components in the separation result. Therefore, the present disclosure takes the separation result of the above polarization guidance model as a constraint, and proposes a global separation model as shown below:

$$\min_{R_D, R_S} \|I - R_D - R_S\|_F^2 + \|R_D - f(D)\|_F^2 + \lambda \|S\|_0.$$

Wherein, $R_D$ represents the diffuse reflection component of the entire polarized color image. $R_S$ represents the highlight reflection component of the entire polarized color image. I represents a polarized color image. F represents a numerical value. $\| \|_F^2$ represents the square of the F norm. D represents the diffuse reflection component in each cluster. f (D) represents the diffuse reflection component separated by the polarization guidance model. $\lambda$ represents a coefficient that balances the sparsity of highlight components. S represents the highlight reflection component. $\| \|_0$ represents the 0 norm.

Based on the ADMM optimization strategy, the present disclosure performs a global adjustment on the polarized color image of the above separation model, and in the end obtains a highlight reflection separation result with a fineness greater than a predetermined threshold.

Figure 6:
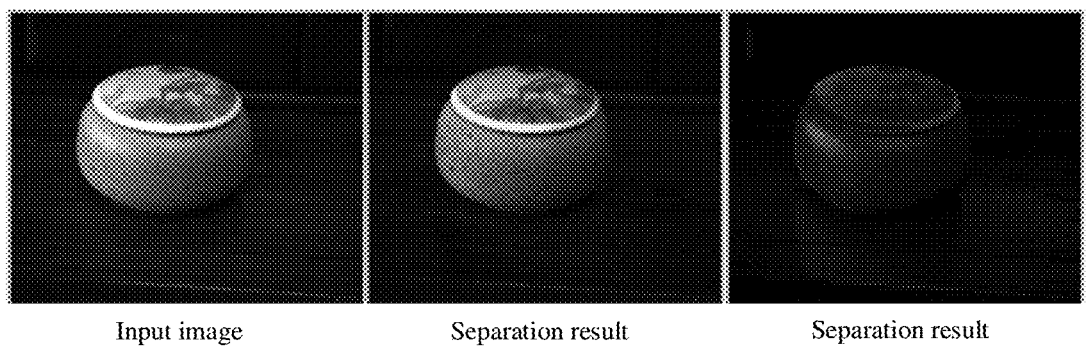
FIG. 6 is a schematic diagram of the separation result of a polarized color image under complicated lighting conditions according to the present disclosure.

Further refer to FIG. 6, which is a schematic diagram of the separation result of the polarized color image of the present disclosure under complex lighting conditions. Since the present disclosure introduces a polarization guidance model, the difference from the previous methods is that the application scenario of highlight reflection separation proposed by the present disclosure does not need the known lighting information or make assumptions about the lighting information. Therefore, in a natural scene with complex ambient light, the present disclosure can still obtain a satisfactory result of highlight reflection separation.

The above description is only some preferred embodiments of the present disclosure and an explanation of the applied technical principles. Those skilled in the art should understand that the scope of disclosure involved in the embodiments of the present disclosure is not limited to the technical solutions formed by the specific combination of the above technical features, but should also cover other technical solutions formed by any combination of the above technical features or their equivalent features in the case of not departing from the above-mentioned inventive concept, for example, technical solutions formed by replacing the above features with the technical features of similar functions disclosed in (but not limited to) the embodiments of the present disclosure.

What is claimed is:
1. A method for calculating image highlight reflection separation, comprising:
controlling a polarized color sensor to shoot a polarized color image, and calculating a polarized chromaticity image according to polarization information and color information of the polarized color image;

based on characteristics of the polarization information, using the polarized chromaticity image as a guide, clustering pixels of diffuse reflection components whose chromaticity differences are within a preset range to obtain a pixel sequence set, wherein the characteristics of the polarization information are the characteristics that, in case the polarized chromaticity image has highlight information, color information of the diffuse reflection components of the polarized color image is still obtained, and wherein each pixel in every pixel sequence in the pixel sequence set has a diffuse reflection component whose chromaticity meets a preset condition, and due to difference in surface material and lighting direction, each pixel in every pixel sequence in the pixel sequence set has a different degree of highlight reflection component;

using a robust principal component analysis algorithm for each pixel in every pixel sequence in the pixel sequence set, to retain the diffuse reflection component of each pixel in the pixel sequence, and at the same time, remove the highlight reflection component of each pixel in the pixel sequence, and in the end, preliminarily separate the polarized chromaticity image into the diffuse reflection component and the highlight reflection component, to obtain an initial separation result, wherein the initial separation result includes the diffuse reflection component and the highlight reflection component, and there is an invariant highlight reflection component in the diffuse reflection component;

using the initial separation result as a constraint and based on an iterative optimization algorithm of an alternating direction method of multipliers, further processing the polarized color image for highlight reflection separation to obtain a highlight reflection separation result, and generating a diffuse reflection image based on the highlight reflection separation result.

2. The method of claim 1, wherein the controlling a polarized color sensor to shoot a polarized color image and calculating a polarized chromaticity image according to polarization information and color information of the polarized color image, includes:

using a single-chip polarized color sensor to collect the polarized color image;

performing polarization separation on the highlight reflection component to obtain a separation result, wherein the highlight reflection component has strong polarization;

calculating the polarized chromaticity image through the separation result.

3. The method of claim 2, wherein the based on characteristics of the polarization information, using the polarized chromaticity image as a guide and clustering the pixels of diffuse reflection components whose chromaticity differences are within a preset range to obtain a pixel sequence set, includes:

making use of a characteristic that the polarized chromaticity image still shows colors of the diffuse reflection components of the pixels in the case of unknown lighting information, clustering the pixels of diffuse reflection components whose chromaticity differencs are within a preset range in the polarized color image to obtain the pixel sequence set.

4. The method of claim 3, wherein the using a robust principal component analysis algorithm for each pixel in every pixel sequence in the pixel sequence set to retain the diffuse reflection component of each pixel in the pixel sequence, and at the same time, remove the highlight reflection component of each pixel in the pixel sequence, and in the end, preliminarily separating the polarized chromaticity image into the diffuse reflection component and the highlight reflection component to obtain an initial separation result, includes:

viewing the highlight reflection component as noise in the pixel sequence set, wherein, each pixel in every pixel sequence in the pixel sequence set has a diffuse reflection component whose chromaticity meets a preset condition and a highlight reflection component with a different degree value;

using the robust principal component analysis algorithm to directly de-noise each pixel sequence, so as to preliminarily obtain the separated diffuse reflection component and highlight reflection component, and obtain the initial separation result.

5. The method of claim 4, wherein the using the initial separation result as a constraint and based on the iterative optimization algorithm of the alternating direction method of multipliers, further processing the polarized color image for highlight reflection separation to obtain a highlight reflection separation result, and generating a diffuse reflection image based on the highlight reflection separation result, includes:

based on an iterative optimization model, using the initial separation result as a constraint, and using an ADMM (Alternating Direction Method of Multipliers) optimization strategy to generate the highlight reflection separation result, and further adjusting the highlight reflection separation result of the polarized color image to obtain the diffuse reflection image, wherein the highlight reflection component has a polarization whose intensity is greater than a predetermined threshold, but some highlight reflection components will not change with a change of a polarization angle, which makes the diffuse reflection components included in the initial separation result comprise a certain number of highlight reflection components.

\* \* \* \* \*